Aug. 4, 1964
F. B. KRAFFT ETAL
3,142,952
STRANDING APPARATUS
Filed May 8, 1962
5 Sheets-Sheet 1
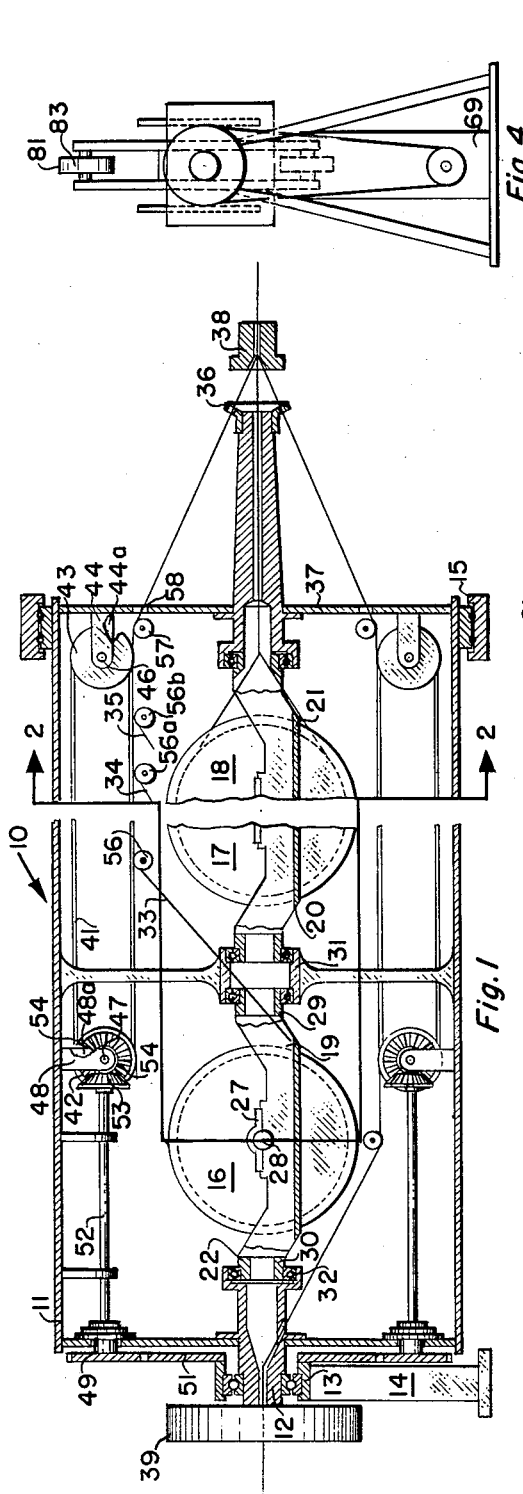
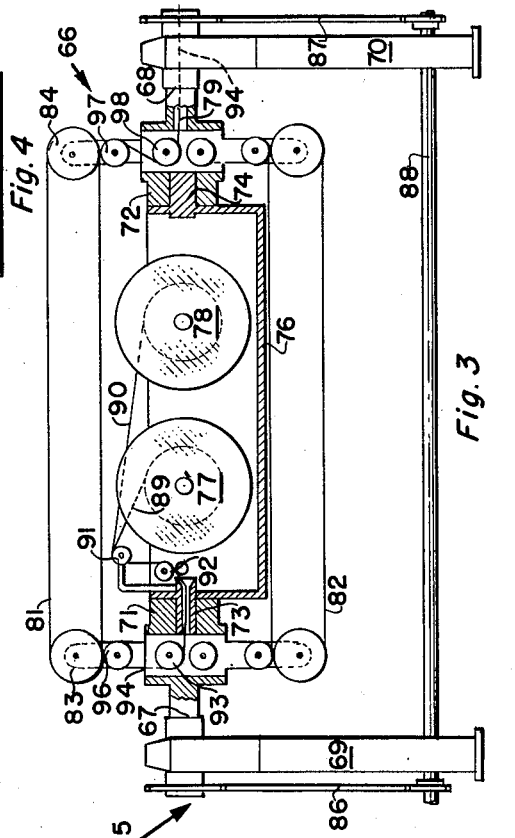
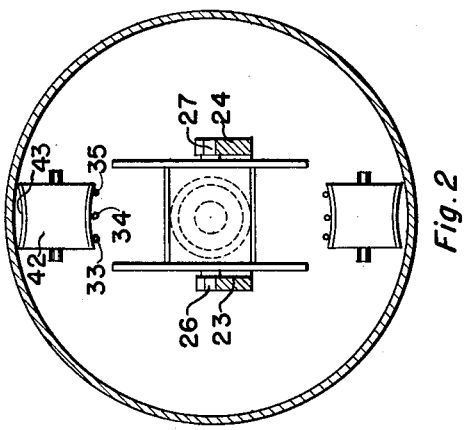
INVENTORS
FREDERIC B. KRAFFT
ROY E. CORRALL
JOACHIM F. OTTO
BY *V. F. Volk*
THEIR AGENT Aug. 4, 1964    F. B. KRAFFT ETAL    3,142,952
STRANDING APPARATUS
Filed May 8, 1962    5 Sheets-Sheet 2

INVENTORS
FREDERIC B. KRAFFT
ROY E. CORRALL
JOACHIM F. OTTO
BY *U. F. Volk*
THEIR AGENT

INVENTOR.
FREDERIC B. KRAFFT
ROY E. CORRALL
JOACHIM F. OTTO

BY  J. F. Voek

THEIR AGENT

Aug. 4, 1964
F. B. KRAFFT ETAL
3,142,952
STRANDING APPARATUS
Filed May 8, 1962
5 Sheets-Sheet 4
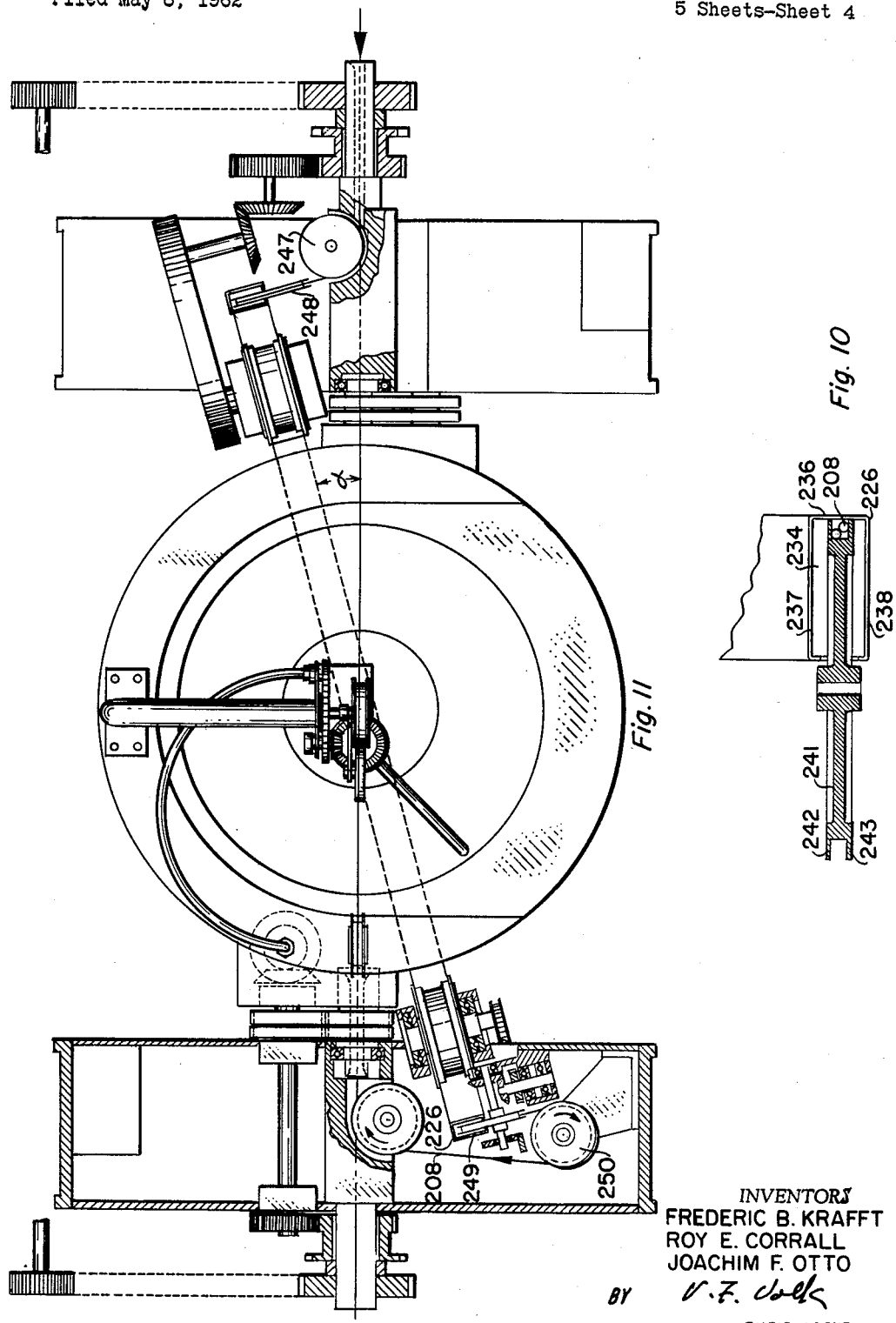
INVENTORS
FREDERIC B. KRAFFT
ROY E. CORRALL
JOACHIM F. OTTO
BY *V. F. Volk*
THEIR AGENT

3,142,952
STRANDING APPARATUS

Frederic B. Krafft, Roy E. Corrall, and Joachim F. Otto, Hastings on Hudson, N.Y., assignors, by mesne assignments, to Anaconda Wire and Cable Company, a corporation of Delaware
Filed May 8, 1962, Ser. No. 193,204
20 Claims. (Cl. 57—58.32)

Our invention relates to stranding apparatus and particularly to apparatus wherein the strand is supported on an endless belt.

It has long been known to twist two or more strands, such as strands of insulated wire, together by rotating or swinging one or more of the strands around a stored supply of the same. The rotating strands are guided and supported by a flyer while the stored wire is supported in a cradle mechanism around which the flyer is free to rotate. Many different mechanical arrangements of flyer mechanisms are known some of which will be discussed in detail hereinafter as they relate to our present invention. All known apparatus has, however, one defect which has seriously limited the speed at which stranders might operate. This defect resides in the frictional resistance encountered by the wire as it advances through the flyer and is particularly troublesome for small diameter wires such as insulated telephone wires comprising a conductor material such as soft copper which will be drawn-down if it is subjected to too great tensile stress and will also work-harden and suffer a loss of electrical conductivity.

It is a principal object of our invention to provide a strander that can be operated at very high speeds on fine strand without subjecting the strands to excessive tensile stress.

To achieve this object we have invented a strand twisting apparatus comprising a flyer, a strand storing reel or a plurality of said reels, a cradle supporting the reel or reels, means supporting the flyer in a position rotatable around the reel and cradle, drive means rotating the flyer and an endless belt mounted on the flyer and revolving therewith. We have also provided guide means guiding the strand between the reel and the belt, and means advancing the strand, the strand being urged against the belt by the centrifugal force resulting from the rotation of the flyer and the belt advancing it at approximately the same speed of advancement as the strand. Our invention may advantageously include apparatus for driving the endless belt. The flyer of our apparatus may be supported in journals at least one of which is tubular and means may be provided for advancing the strand through the tubular journal to an external location. The strand reels may be driven so that the tensions in the strands are maintained below predetermined values thus utilizing to the fullest extent the strain relieving feature of the endless belt element of our invention. Our apparatus may include strand supply means at a fixed station paying onto an endless belt through a tubular journal and the endless belt of our invention may advantageously have walls defining a lengthwise groove which may be slit crosswise at a plurality of points along its length. In one embodiment, our apparatus comprises a rigid hoop, means for supporting the hoop rotatable around the reel and cradle on a first axis coinciding with the line of advancement of the strand, and rotatable in the plane of the hoop around a second axis transverse to the first axis. The hoop may advantageously have a section in the form of a channel substantially parallel to the second axis and means such as an assembly of sheaves for guiding the strand into the channel with one sheave entering the channel and depositing the strand therein. The hoop may advantageously have a section in the form of a radial wedge-shaped channel and in this case our apparatus comprises an endless belt, also wedge-shaped, closing the channel and holding in the strand.

A more thorough understanding of our invention can be gained from the appended drawing.

In the drawing:

FIGURE 1 is a sectional side view of a strander embodying our invention.

FIGURE 2 is a vertical section through the plane 2—2 of FIGURE 1.

FIGURE 3 is a sectional side view of another strander embodying our invention.

FIGURE 4 is an end view of the strander of FIGURE 3.

FIGURE 10 is an enlarged view of a section taken through the plane 10—10 of FIGURE 8.

FIGURE 11 is a plan view, partly in section, of another embodiment of our invention.

Figure 7:
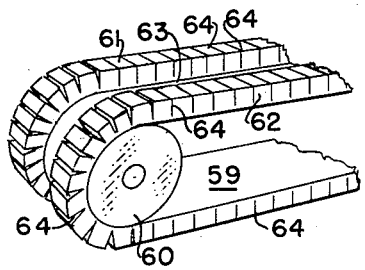
FIGURE 7 is a detail, in perspective, of an element of our invention.

Referring to FIGURE 1 a strander indicated generally by the numeral 10 comprises an elongated barrel 11 supported at its left end by a journal 12 in a bearing 13 of a standard 14 and at its right end the barrel itself is supported in a large roller bearing 15. Wire reels 16, 17, 18 are supported respectively in cradles 19, 20, 21 but it will be understood that although, merely for purposes of illustration, we have shown only three reels within the barrel 11, a fewer or greater number may be used without exceeding the scope of our invention. Where, due to the need for encompassing a multiplicity of reels, the barrel 11 is of great length, it may be supported at any plurality of points along its length by large roller bearings similar to the bearing 15.

The cradles 19, 20, 21 which are of uniform conventional design, consist of a horizontal frame 22 with side walls 23, 24 (FIGURE 2) fitted with bearings 26, 27 designed to receive a reel shaft 28 on which the reel 16 is rotatably mounted. Each of the cradles such as the cradle 19 has a front journal 29 and a rear journal 30 which fit respectively into bearings 31, 32 rigidly attached to the barrel 11. The lower portions of the cradles are weighted so that the cradles maintain a horizontal position within their bearings regardless of any rotation of the barrel 11. The barrel 11 constitutes a flyer carrying strands 33, 34, 35 from the reels mounted therein in a swinging or rotational path around the reels themselves. This is the real function of the barrel flyer 11 and the particular cylindrical shape is one of structural convenience. The strands 33, 34, 35 pass through a lay plate 36 extending from a front face plate 37 of the barrel 11, through a closing die 38 to a take-up capstan and take-up reel, not shown. The advancement of the strands is due to the traction of the capstan and in prior art stranders the strands 33, 34, 35 are guided down the length of the barrel through eyelets or similar devices spaced along the barrel walls. The barrel 11 is rotated in its bearings 13, 15 by means of a pulley 39 and a drive belt and external motor not shown. The rotation of the barrel creates a centrifugal force which in prior art apparatus presses the strands against the walls of the barrel. This has resulted in frictional loads which produce undue tensions in the strands. For example the tension in a strand has been found to be as high as six pounds on leaving a strander where the amount of tension required to turn its pay-off reel was known to be only one pound. The additional five pounds of tension resulted from the frictional resistance between the strand and the inner surface of the flyer. In FIGURE 1 we have shown our invention for twisting strands under greatly reduced tension. This comprises an endless belt 41 mounted over rolls 42, 43. The roll 43 is mounted by means of a pair of brackets 44, 44a onto the forward plate 37 to rotate on a shaft 46. The rearward roll 42 rotates on a shaft 47 mounted in brackets 48, 48a. A pinion 49 mounted to move with the barrel 11 rotates against a stationary gear 51 rigidly mounted on the standard 14 and drives a shaft 52 terminating in a bevel gear 53. The gear 53 meshes with a gear 54 mounted on the face of the roll 42 to drive the assembly of the endless belt 41. By a judicious selection of gears 51, 49, 53, 54 the belt can be driven at any desired ratio of the rotation of the barrel 11 and the gears are so chosen that the speed of the belt 41 is equal or approximately equal to the speed that the strands are advanced by the capstan (not shown). As the strand 33 leaves the reel 16 it is guided to the belt 41 by a sheave 56 and the wires 34, 35 are similarly guided by respective sheaves 56a, 56b. Each of the strands leaving the belt 41 is guided by a sheave such as a sheave 57 through a hole such as a hole 58 in the plate 37 to the lay plate 36. As best shown in FIGURE 2 the rolls 42 and 43 are concave to give the belt 41 a trough-like shape whereby the strands 33, 34, 35 are prevented from being blown off the belt by the windage created when the assembly rotates. Alternatively a belt such as that shown in FIGURE 7 may be used where it is found necessary to prevent strands from moving laterally thereon. In FIGURE 7 an endless belt 59 riding over a roll 60 has side walls 61, 62 projecting from the surface. The walls 61, 62 define a groove or channel 63 in the center of the belt and extending lengthwise thereof. A plurality of evenly spaced slits 64 are cut through the walls 61, 62 to permit the belt 59 to ride over the roll 60 wtihout distortion. Although we have shown a belt having two walls defining a single groove it will readily be understood that a further plurality of walls may be used defining a number of grooves and a groove may be introduced for each strand or subgroup of strands to be carried by the belt. At the other extreme it will be understood that although we have shown a driven belt, under some circumstances, a light belt mounted on low-friction ball-bearing rollers may reduce the frictional drag on the strands sufficiently when the belt is advanced by the motion of the strands themselves and without a special belt drive. Although, in the interest of clarity, we have shown apparatus for imparting a single direction of lay, apparatus made to our invention can be caused to deliver an opposite lay by changes made in a known manner.

In the embodiment of our invention indicated generally by numeral 65 of FIGURE 3 a flyer, indicated generally by the numeral 66, is mounted by means of journals 67, 68 in respective standards 69, 70. The flyer incorporates two opposing bearings 71, 72 into which are rotatably fitted respective journals 73, 74 of a cradle 76 within which are rotatably mounted a plurality of reels 77, 78. It will be understood that although we have illustrated apparatus in which the strands are stored on reels our invention is not limited to any particular means of strand storage. Other methods of storing strands in apparatus within the scope of our invention might include coils or hanks or containers of various known types from which the strand can be drawn easily. The word "reel" as used in this application has reference to any of the known means of storing strands for ready withdrawal or accumulation.

One of the journals of the flyer 66, specifically the journal 68, is tubular having a center bore 79 through which strands can be paid to an outside station, and one of the journals of the cradle 76, specifically the journal 73, is also tubular. An endless belt 81 is mounted on the flyer 66 and is counter-weighted by a duplicate endless belt 82. Alternatively the belt 82 may be omitted and weights of lead or other heavy material may be used as counterweights to the belt 81 in a known manner of applying counterweights to rotating objects. The belt 81 is narrow (see FIGURE 4) compared to the belt 41 of FIGURE 1 inasmuch as, as will hereinafter be related, the belt 81 is required to carry but a single twisted strand. The belt 81 is carried by rolls 83, 84 and is driven in a manner equivalent to that shown in FIGURE 1 for driving the belt 41 and here omitted for the sake of clarity. Numerous methods of arranging gear trains or chain and sprocket devices for driving wheels within rotating assemblies are known and may be used within the scope of our invention. The flyer 66, including the endless belt assembly is driven by two chains 86, 87 from a drive shaft 88, driven in turn by an external means not shown. The cradle 76, however, has a center of gravity below the axis of the journals 73, 74 and remains substantially stationary within the imaginary cylinder defined by the rotation of the flyer 66. Strands 89, 90 drawn respectively from the reels 77, 78 are guided by sheaves 91, 92 through the hollow journal 73 to a guide sheave 93 at which point they are twisted together due to the rotation of the sheave 93 with the flyer 66 while the cradle 76 remains stationary. From the sheave 93 the strands 89, 90 now combined to form a twisted strand 94, are guided by another sheave 96 to the belt 81 which supports them to the point where another sheave 97 guides the twisted strand to a sheave 98 from which it progresses to a fixed station external to the strander 65. Due to the fact that the sheave 98 is rotating with the flyer 66 while the external take-up (not shown) is stationary the strand 94 receives an additional twist at the sheave 98. Absent the endless belt 81 and the strand 94 would be thrown outwardly in a loop which, even if the strander were so placed that the loop did not strike the floor or other external objects, would create a severe tensile stress in the strand 94.

Figure 5:
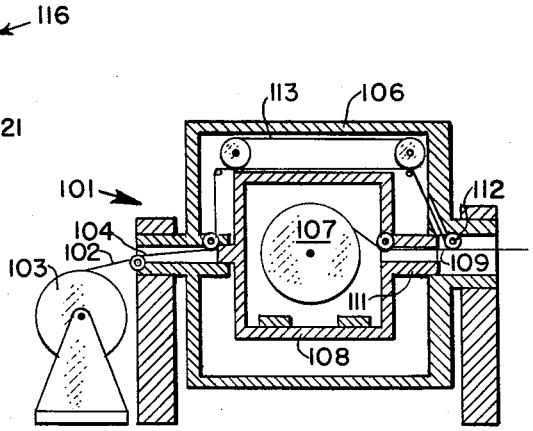
FIGURE 5 is a sectional side view of still another strander embodying our invention.

In FIGURE 5 we have shown a diagrammatic representation of a twinner 101 which is a strander wherein a strand 102 is paid from a stationary source such as a reel 103 through a tubular journal 104 supporting a flyer 106 to swing around a strand supply 107, which may conveniently be a reel as shown, mounted in a cradle 108. A strand 109, paid from the reel 107 passes through a tubular journal 111 in the cradle 108 and is brought together with the strand 102 at a sheave 112 where the strands are twisted together. To prevent excessive tension in the strand 102 we support it on an endless belt 113 which is driven by a means not shown at the same speed as the strand.

Figure 6:
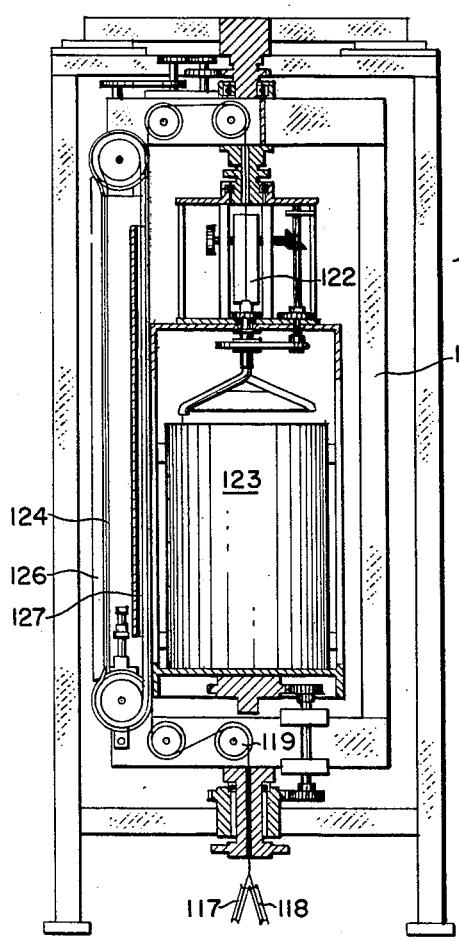
FIGURE 6 is a sectional elevation of still another strander embodying our invention.

In FIGURE 6 we have shown a strander of the general type disclosed in application Serial No. 117,138, filed June 14, 1961, now Patent No. 3,079,747, and assigned to the assignee of the instant application. The strander is indicated generally by the numeral 116 and has strands 117, 118 supplied from an outside source, not shown, and twisted together at a sheave 119 by reason of the rotation of a flyer 121. The twisted strands are advanced by a caterpillar capstan 122 and deposited in a drum 123. To prevent excessive tension in the strands we have provided the improvement incorporating a grooved endless belt 124 mounted vertically on the flyer 121. To prevent belling of the belt 124 by centrifugal force we have provided smooth-surfaced backing plates 126, 127. It will be understood that backing plates analagous to the plates 126, 127 may also be used on the belts of stranders of the types shown in FIGURES 1, 3, and 5 within the scope of our invention.

Figure 8:
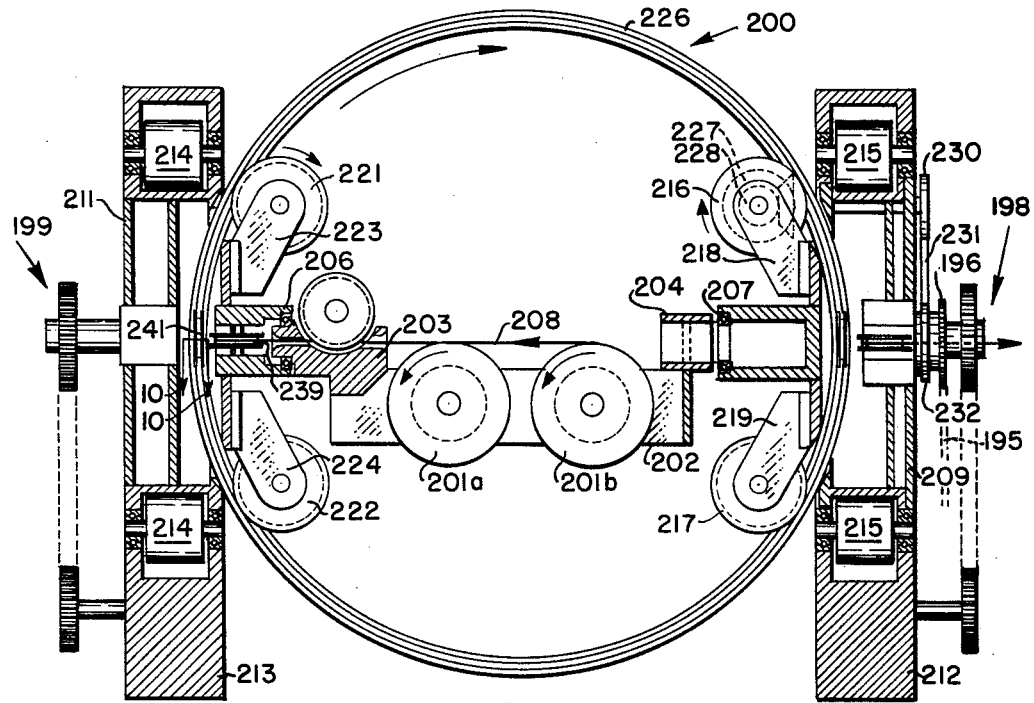
FIGURE 8 is a side view, partly in section, of another embodiment of the strander of our invention.
Figure 9:
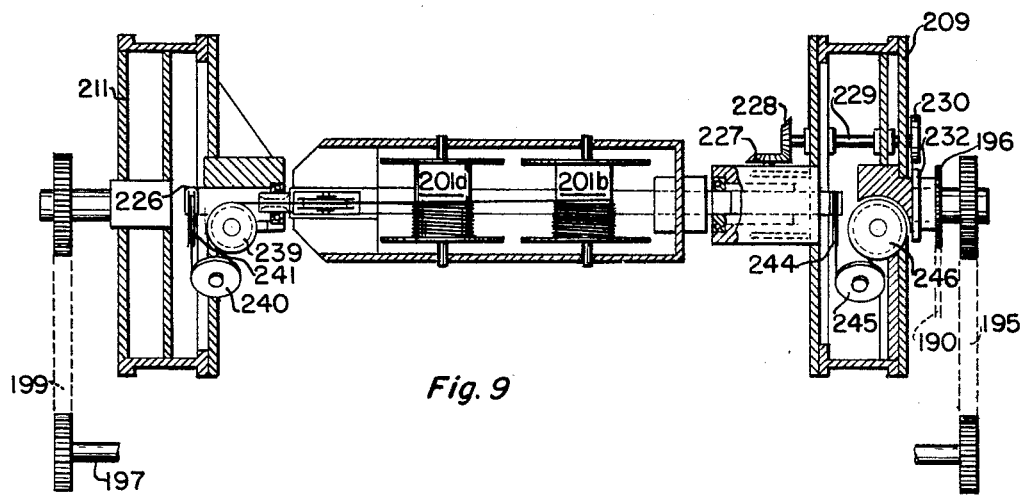
FIGURE 9 is a plan view, partly in section, of the strander of FIGURE 8.
Figure 12:
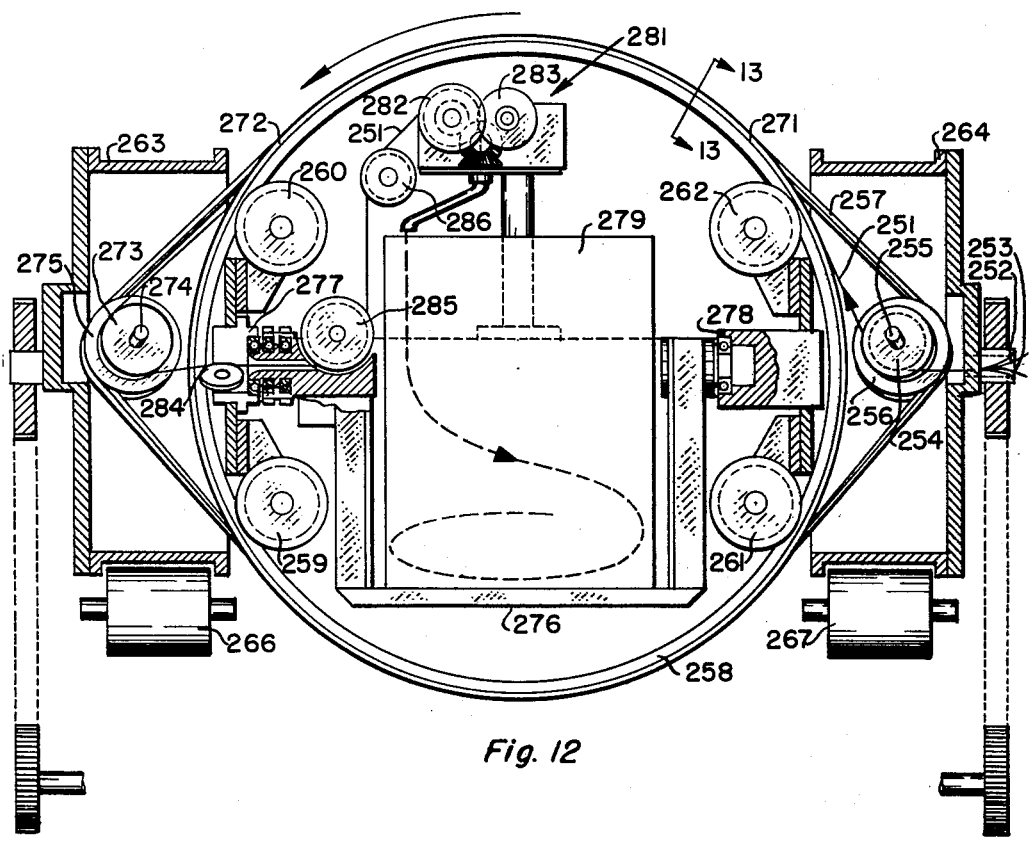
FIGURE 12 is a side view, partly in section, of still another embodiment of our invention.
Figure 13:
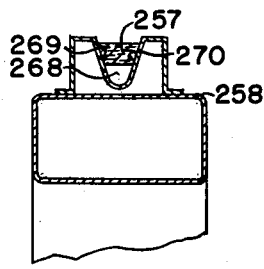
FIGURE 13 is an enlarged view of a section taken through the plane 13—13 of FIGURE 12.

In the embodiments of our invention illustrated by the FIGURES 8–13 the strands are advanced by means of a hoop that rotates around a reel, reels or other storage means and its cradle and also rotates in its own plane. In FIGURE 8 a strander, indicated generally by the numeral 200, has a pair of reels 201a, 201b supported in a cradle 202 suspended by journals 203, 204 in bearings 206, 207. The journal 203 is hollow so that a strand 208 can be payed through the journal 203 from the reels 201a, 201b. As used in our strander the reels 201a and 201b are merely means of storing strand. The strand 208 might also be payed from coils, or from drums without affecting the essential novelty of our invention and it will be understood that we are using the word "reel" throughout this application to include other equivalent strand-storing means. The bearing 207 is rigidly fixed to a hollow trunnion 209 and the bearing 206 is rigidly fixed to a hollow trunnion 211. The trunnions 209 and 211 are supported by respective standards 212, 213 and are free to rotate on rollers of which only the pairs of rollers 214, 215 can be seen in the drawing. The trunnions are conveniently driven by means of gear trains indicated generally by the numerals 199 and 198 connecting to a common drive shaft 197 (FIGURE 9). Sheaves 216, 217 are mounted on the trunnion 209 by means of respective pairs of brackets 218, 219 and sheaves 221, 222 are mounted on the trunnion 211 by means of respective pairs of brackets 223, 224. The sheaves 216, 217, 221, 222 support a rigid hoop 226 rotatable in its own plane by reason of the turning of the sheaves on their own axes. Due to the fact that the sheave assemblies that support the hoop are themselves rigidly fixed to the trunnions 209, 211, the hoop 226 is also free to rotate on its own horizontal diameter. The hoop 226 is large enough to encompass the cradle 202 and reels 201a and 201b and rotates around them in the operation of our apparatus. In order to drive the hoop 226 the sheave 216 is driven through bevel gears 227, 228, shaft 229, sprocket 230, chain 231, and sprocket 232. The sprocket 232 is rotatably mounted in common with a sprocket 196 which can be held stationary, or driven, by a chain 195 connected to driving or holding means not shown. The shaft 229 passes through the trunnion 209 so that the rotation of the trunnion combined with rotation imparted by the chain 195 will cause the sheave 216 to turn and drive the hoop 226. The hoop 226 has the cross-section shown in FIGURE 10 with a channel 234 formed by walls 236, 237 and 238. In operation the outer wall 238 supports the strand 208 from flying out due to centrifugal action. In order to deposit the combined strand 208 from the reels 201a and 201b in the channel 234 of the hoop 226 an assembly of sheaves 239, 240, 241 (FIGURE 9) are mounted to the hollow trunnion 211 to revolve around the center of rotation of the trunnion. The sheave 239 is in line with the strand 208 and the sheave 241 is mounted perpendicular to it. The sheave 240 is an idler affording the necessary change of direction between the sheaves 239 and 241 in a known manner. The sheave 241 extends into the channel 234 of the hoop 226 so as to deposit the strand 208 within the channel. The sheave 241 has flanges 242 and 243 confining the strand, and these flanges abut the wall 236 so that at the instant of its release the strand 208 is confined between the wall 236, flanges 242 and 243 and the hub of the sheave 241. Since the sheave 239 is revolving relative to the cradle 202 the strands 208a, 208b are twisted around each other at the sheave 239 for each rotation of the trunnion 211. The strands are carried toward the trunnion 209 by the rotation of the hoop 226 (upward in FIGURE 8 and out of the plane of the paper in FIGURE 9). The speed of the hoop 226 is adjusted to coincide with the forward motion of the strand 208 which is taken up by a mechanism of known type that does not appear in the drawing. There is no relative motion between the strand 208 and the hoop 226 between the points of entrance into and exit from the hoop so that there can be no damage to the strand from abrasion. Similarly in its swing around the cradle 202 the entire length of strand 208 is supported by the wall 238 of the hoop 226 so that it is not in danger of being stretched. Mounted on the trunnion 209 there is another assembly of sheaves 244, 245, 246 which guides the strand 208 to move forward again in a rectilinear path to a stationary take-up station not shown. Since the sheave 246 is revolving around the line of advance of the strand 208 an additional twist is imparted to the strand between the sheave 246 and the stationary take-up. It will be understood that a novel feature of the invention of FIGURES 8 and 9 is the hoop means for conveying the strand and although we have shown a strander of the type where the pay-off storage is mounted on the cradle and the take-up is external to the machine, our invention can also be applied where the take-up is mounted in the cradle and the strands are paid into the strander from an outside source. This form of operation is shown in FIGURES 11 and 12.

In FIGURE 11 we show an embodiment of the invention with a simplified method of feeding the strand 208 into the hoop 226. Here the hoop 226 is mounted at an angle $\alpha$ such as 15° to the line of advance of the strand. The axis of rotation of the hoop in its own plane will thus be oblique to the axis of rotation around the cradle. The advantage of the embodiment of FIGURE 11 is the omission of the idler sheaves 240 and 245 since only two sheaves 247 and 248 are required to pay the strand into the hoop 226.

In FIGURE 12 a strand 251 which may be made up of a plurality of elements such as two insulated conductors 252, 253 supplied from payoff stations (not shown) are paid over a sheave 254 mounted to rotate freely on a shaft 255 which also supports a sheave 256 which carries a truncated V-belt 257. In operation the sheave 254 rotates in a direction opposite to that of the sheave 256 as shall be shown. A rigid hoop 258 is supported on sheaves 259, 260, 261, 262 mounted on trunnions 263, 264 rotatably supported on rollers 266, 267, respectively. The hoop 258 has the section shown in FIGURE 13 with a channel 268 defined by walls 269, 270 opening radially outwardly. The channel 268 is closed by the belt 257 which also serves to drive the hoop 258. The sheave 256 is itself driven to turn by conventional means not shown but which may be analogous to the means shown in FIGURE 8 for driving the sheave 221. As the hoop 258 rotates, the strand 251 passes from the sheave 254 into the channel 268 where it is confined by the belt 257 at a point 271 and carried to a point 272 where it is withdrawn over another free turning sheave 273. The sheaves 254 and 273 project sufficiently from the plane of the hoop 258 for the strand 251 to clear the rim of the hoop. The sheave 273 is mounted on a shaft 274 which supports a sheave 275 which serves to lift the belt 257 from the channel 268. A cradle 276 is mounted in bearings 277, 278 respectively mounted on the trunnions 263, 264. The cradle 276 supports a strand-storing drum 279 and a strand-advancing capstan 281 comprising pinch rolls 282, 283. The strand 251 is guided to the capstan 281 from the sheave 273 by guide sheaves 284, 285, 286. The guide sheave 284 is mounted on the trunnion 263 and revolves around the axis of rotation of the trunnions 263, 264 and the hoop 258 while the sheave 285 is mounted on the cradle 276 so that it does not revolve. Consequently, between the sheaves 284 and 285 the strand 251 is twisted once for each rotation of the hoop 258 around its common axis with the trunnions. This twist is additional to the twist acquired by the strand at the sheave 254. Although we have shown apparatus in which our novel hoop is employed in stranders of the type where the strand take-up storage reel or the pay-off reels are mounted on the strander cradle, it will also be understood that from the disclosures hereinbefore made a strander of the type shown in FIGURE 5 may be built where hoops of types described can be used to replace the cradle 108.

We have invented a new and useful improvement in strand twisters for which we desire an award of Letters Patent.

We claim:

1. A strand twisting apparatus comprising a flyer, a strand storing reel, a cradle supporting said reel, means supporting said flyer rotatable around said reel and said cradle, drive means rotating said flyer, an endless belt mounted on said flyer and revolving therewith, guide means guiding a strand between said reel and said belt, means advancing said strand, said strand being urged against said belt by the centrifugal force resulting from the rotation of said flyer, said belt advancing at approximately the same speed of advancement as said strand.

2. A strand twisting apparatus comprising a flyer, a strand storing reel, a cradle supporting said reel, means supporting said flyer rotatable around said reel and said cradle, drive means rotating said flyer, an endless belt mounted on said flyer and revolving therewith, guide means guiding a strand between said reel and said belt, means advancing said strand, means driving said belt at approximately the same speed as the speed of advancement of said strand, said strand being urged against said belt by the centrifugal force resulting from the rotation of said flyer.

3. A strand twisting apparatus comprising a flyer, a strand supply reel, a cradle supporting said reel, a pair of journals supporting said flyer rotatable around said reel and said cradle, at least one of said journals being tubular, drive means rotating said flyer, means continuously advancing a strand through said tubular journal to a location external to said apparatus, an endless belt mounted on said flyer and revolving therewith, guide means guiding said strand between said reel and said belt, means advancing said belt at approximately the same speed as the speed of advancement of said strand, said strand being urged against said belt by the centrifugal force resulting from the rotation of said flyer.

4. A strand twisting apparatus comprising a flyer, a strand supply reel, a cradle supporting said reel, means driving said reel whereby the tension in a strand is maintained below a predetermined value, a pair of journals supporting said flyer rotatable around said reel and said cradle, drive means rotating said flyer, means continuously advancing said strand to a location external of said apparatus, an endless belt mounted on said flyer and revolving therewith, guide means guiding said strand between said reel and said belt, means advancing said belt at approximately the same speed as the speed of advancement of said strand, said strand being urged against said belt by the centrifugal force resulting from the rotation of said flyer.

5. A strand twisting apparatus comprising a flyer, a strand supply reel, a cradle supporting said reel, means supporting said flyer rotatable around said reel and said cradle, drive means rotating said flyer, means continuously advancing a strand to a location external to said apparatus, an endless belt mounted on said flyer and revolving therewith, guide means guiding a strand to said belt, means advancing said belt at approximately the same speed as the speed of advancement of said strand, said strand being urged against said belt by the centrifugal force resulting from the rotation of said flyer.

6. A strand twisting apparatus comprising a flyer, a plurality of strand supply reels, cradle means supporting said plurality of reels, means supporting said flyer rotatable around said reels and said cradle means, drive means rotating said flyer so as to twist together strands from said reels, means continuously advancing the twisted strand to a location external to said apparatus, an endless belt mounted on said flyer and revolving therewith, guide means guiding the strand from at least one of said reels to said belt, means advancing said belt at approximately the same speed as the speed of advancement of said strand, said strand being urged against said belt by the centrifugal force resulting from the rotation of said flyer.

7. A strand twisting apparatus comprising a flyer, a plurality of strand supply reels, cradle means comprising at least one tubular journal supporting said plurality of reels, means supporting said flyer rotatable around said reels and said cradle means, said supporting means comprising at least one tubular journal, an endless belt mounted on said flyer and revolving therewith, guide means guiding strands from said plurality of reels through said tubular journal in said cradle means thereby twisting together said strands, additional guide means guiding said twisted strands thence to said belt, means for advancing said strands, means for advancing said belt at approximately the same speed as the speed of advancement of said strands, said strands being urged against said belt by the centrifugal force resulting from the rotation of said flyer, guide means guiding said twisted strands from said belt through said tubular journal in said flyer supporting means to a station externally of said apparatus.

8. A strand twisting apparatus comprising a flyer, a first strand supply reel mounted at a fixed station external to said flyer, a second strand supply reel, a cradle supporting said second reel, tubular journals supporting said flyer rotatable around said second reel and said cradle, an endless belt mounted on said flyer and revolving therewith, guide means guiding strands from said first reel through one of said tubular journals to said endless belt, means for advancing said strand, means for advancing said belt at approximately the same speed as the speed of advancement of said strand, said strand being urged against said belt by the centrifugal force resulting from the rotation of said flyer, guide means guiding said strand from said belt into contact with a strand from said second reel and thence together through the other of said tubular journals to a station external to said strander.

9. A strand twisting apparatus comprising a flyer, means supplying a plurality of strands from a fixed station, storage means for twisted strands, a cradle supporting said storage means, means comprising at least one tubular journal supporting said flyer rotatable around said storage means and said cradle, means rotating said flyer thereby twisting together said strands, an endless belt mounted on said flyer and revolving therewith, guide means guiding said twisted strands to said belt, means advancing said strands, means advancing said belt at approximately the speed of advancement of said strands, said strands being urged against said belt by the centrifugal force resulting from the rotation of said flyer, guide means guiding said twisted strands from said belt to said storage means.

10. A strand twisting apparatus comprising a flyer, a strand storing reel, a cradle supporting said reel, means supporting said flyer rotatable around said reel and said cradle, drive means rotating said flyer, an endless belt mounted on said flyer and revolving therewith, parallel walls projecting from said belt and defining a lengthwise groove therein, guide means guiding a strand between said reel and said belt, means advancing said strand, means advancing said belt at approximately the speed of advancement of said strand, said strand being urged against said belt and within said groove by the centrifugal force resulting from the rotation of said flyer.

11. A strand twisting apparatus comprising a flyer, a strand storing reel, a cradle supporting said reel, means supporting asid flyer rotatable around said reel and said cradle, drive means rotating said flyer, an endless belt mounted on said flyer and revolving therewith, parallel walls projecting from said belt and defining a lengthwise groove therein, said walls being slit crosswise at a plurality of points along the length thereof, guide means guiding a strand between said reel and said belt, means advancing said strand, means advancing said belt at approximately the speed of advancement of said strand, said strand being urged against said belt and within said groove by the centrifugal force resulting from the rotation of said flyer.

12. A strand twisting apparatus comprising a rigid hoop, a strand storing reel, a cradle supporting said reel, means for advancing a strand, means supporting said hoop rotatable around said reel and said cradle on a first axis coinciding with the line of advancement of said strand and rotatable in the plane of said hoop around a second axis transverse to said first axis, said hoop supporting and advancing at least one strand being rotated around said reel and said cradle and being urged against said hoop by centrifugal force.

13. A strand twisting apparatus comprising a rigid hoop, a strand storing reel, a cradle supporting said reel, means for advancing a strand, means supporting said hoop rotatable around said reel and said cradle on a first axis coinciding with the line of advancement of said strand and rotatable in the plane of said hoop around a second axis approximately normal to said first axis, said hoop having a section defining a channel substantially parallel to said second axis, means for guiding said strand into said channel, said hoop rotating around its second axis at approximately the speed of advancement of said strand, said hoop supporting and advancing at least one strand being rotated around said reel and said cradle and being urged against said hoop by centrifugal force.

14. The apparatus of claim 13 wherein said guiding means comprises an assembly of three sheaves mounted to revolve around said first axis.

15. A strand twisting apparatus comprising a rigid hoop, a strand storing reel, a cradle supporting said reel, means for advancing a strand, means supporting said hoop rotatable around said reel and said cradle on a first axis coinciding with the line of advancement of said strand and rotatable in the plane of said hoop around a second axis oblique to said first axis, said hoop having a section defining a channel substantially parallel to said second axis, means for guiding said strand into said channel, said hoop rotating around the second axis at approximately the speed of advancement of said strand, said hoop supporting and advancing at least one strand being rotated around said reel and said cradle and being urged against said hoop by centrifugal force.

16. The apparatus of claim 15 wherein said guiding means comprises an assembly of two sheaves mounted to revolve around said first axis, one of said sheaves entering said channel and depositing said strand therein.

17. A strand twisting apparatus comprising a rigid hoop, a strand storing reel, a cradle supporting said reel, means for advancing a strand, means supporting said hoop rotatable around said reel and said cradle on a first axis coinciding with the line of advancement of said strand and rotatable in the plane of said hoop around a second axis transverse to said first axis, said hoop having a section defining an outwardly opening radial channel, means for guiding said strand between said reel and said channel, and an endless belt closing said channel and holding said strand therein, said belt supporting and advancing at least one strand being rotated around said reel and said cradle and being urged against said hoop by centrifugal force.

18. The apparatus of claim 17 wherein said channel and said belt are wedge-shaped.

19. A strand twisting apparatus comprising a rigid hoop, a strand receiving drum, a cradle supporting said drum, means mounted on said cradle for advancing a strand into said drum, means supporting said hoop rotatable around said drum and said cradle on a first axis coinciding with the line of advancement of said strand and rotatable in the plane of said hoop around a second axis transverse to said first axis, said hoop supporting and advancing at least one strand being rotated around said reel and said cradle and being urged against said hoop by centrifugal force.

20. A strand twisting apparatus comprising strand storing means, strand advancing means, a cradle supporting said storing means, strand supporting means simultaneously rotating around said storing means and advancing in the direction of the axis of said rotating, said supporting means supporting and advancing at least one strand being rotated around said storing means and being urged against said supporting means by centrifugal force.

References Cited in the file of this patent

UNITED STATES PATENTS

| | | |
|---|---|---|
| 555,146 | Barrett | Feb. 25, 1896 |
| 2,171,993 | Reichelt | Sept. 5, 1939 |
| 2,877,620 | Blaisdell | Mar. 17, 1959 |
| 2,910,823 | Bunch | Nov. 3, 1959 |

FOREIGN PATENTS

| | | |
|---|---|---|
| 345,139 | Great Britain | Mar. 19, 1931 |